May 15, 1923.
W. LA HODNY
BRACKET FOR SUPPORTING MIRRORS AND THE LIKE
Filed May 3, 1920
1,455,441
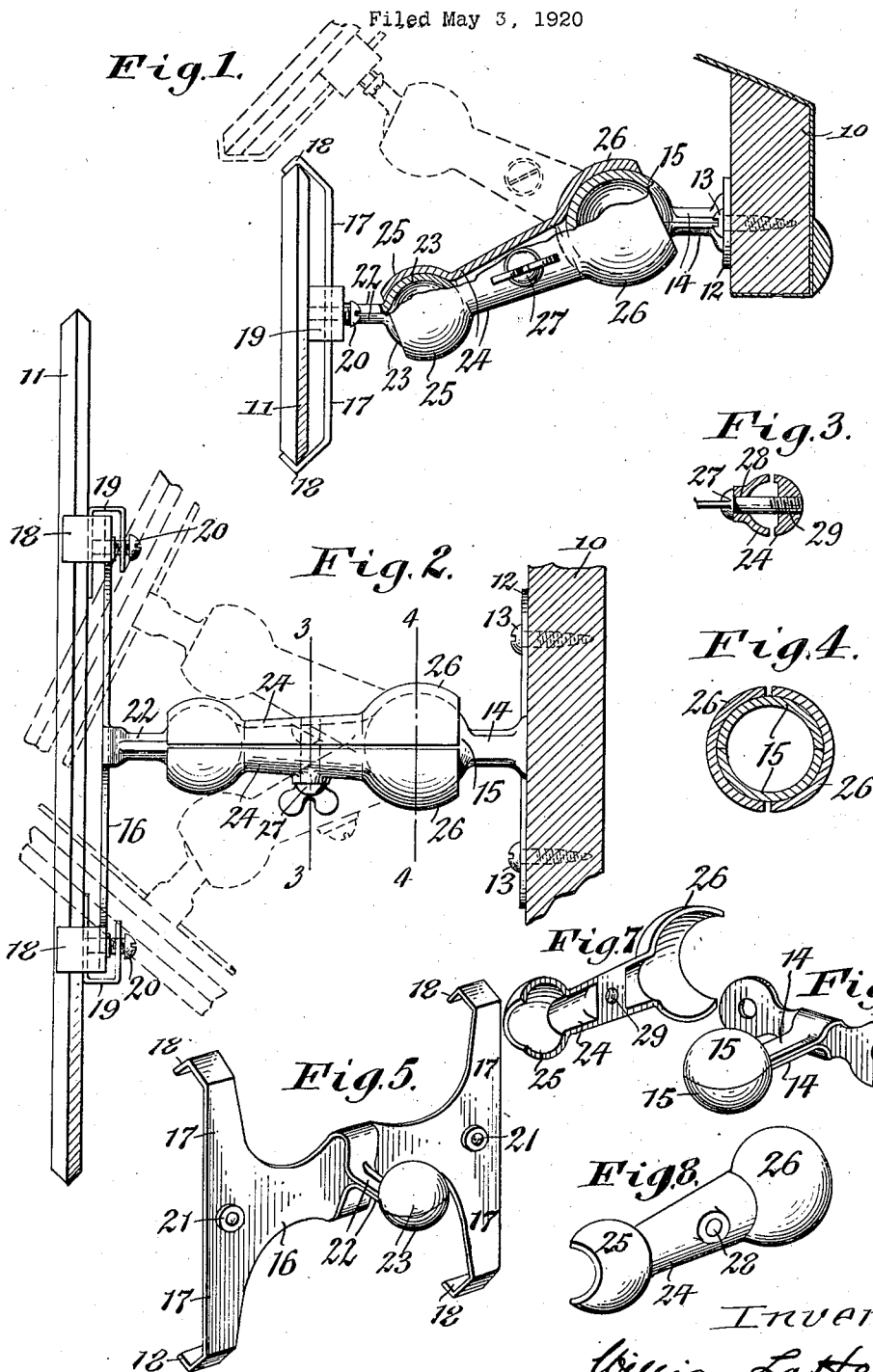

Patented May 15, 1923.

1,455,441

UNITED STATES PATENT OFFICE.

WILLIAM LA HODNY, OF BUFFALO, NEW YORK.

BRACKET FOR SUPPORTING MIRRORS AND THE LIKE.

Application filed May 3, 1920. Serial No. 378,407.

*To all whom it may concern:*

Be it known that I, WILLIAM LA HODNY, a citizen of the United States, residing in the city of Buffalo, in the county of Erie and State of New York, have invented new and useful Improvements in Brackets for Supporting Mirrors and the like, of which the following is a specification.

This invention relates to a bracket which is more particularly intended for supporting a mirror on the canopy of an automobile so that the driver can see what is going on behind him without turning around, but the invention is also applicable for other uses.

The object of this invention is the production of a bracket of this character which can be readily and easily adjusted into various angular positions in order to obtain the required reflection of the mirror, which is simple in construction and neat in appearance and which can be produced at comparatively low cost.

In the accompanying drawings:

Figure 1 is a side elevation, partly in section, of a bracket embodying my invention showing the same employed for mounting a mirror on the top or canopy of an automobile. Figure 2 is a plan view of the same. Figures 3 and 4 are cross sections on the correspondingly numbered lines in Fig. 2. Figures 5, 6, 7 and 8 are perspective views of the several main parts of my improved bracket.

Similar characters of reference refer to like parts throughout the several views.

Although this invention may be employed for various purposes the same is shown in the drawings installed on the front bar 10 of an automobile top or canopy for supporting a mirror 11 thereon. In its general organization this improved bracket consists of an attaching base which is mounted on the automobile top, a supporting head which carries the mirror, and an adjusting arm which is adjustably connected with the base and head. The base comprises an attaching plate 12 which is secured at its ends to the canopy bar by means of screws 13 and two lugs which are bent forwardly toward each other from opposite edges of said plate and constructed to form two reduced sections 14 forming a neck adjacent to the base plate, and two semi-spherical sections 15 which together form a ball. This base plate and the lugs thereof which form the neck and ball thereon are preferably stamped from a single sheet of metal in any suitable or approved manner.

The head comprises a longitudinal plate 16 arranged in rear of the mirror and provided at its opposite ends with two pairs of transverse fingers 17 having hooks 18 which engage with the upper and lower edges, respectively, of the mirror. These hooks are firmly held in engagement with the mirror by means of a plurality of clamps each of which has a body 19 of substantially U-shaped form. The legs of each clamp straddle an edge portion of the head plate. A clamping screw 20 engages with a threaded opening 21 in the head plate and passes with its outer part freely through an opening in the rear leg of the respective clamp while its front end bears against the companion front leg and presses the latter against the rear side of the mirror, as shown in Figs. 1 and 2. Midway of its length the head plate is provided on its opposite longitudinal edges with a pair of rearwardly projecting lugs which form companion sections 22 of a reduced neck adjacent to the head plate, and two semi-spherical sections 23 of a ball, said head plate together with its finger hoops, neck sections and ball sections being constructed integrally of sheet metal in a well known manner.

The adjusting arm is composed of two like longitudinal sections each of which has a semi-tubular body 24 and two semi-spherical sockets 25, 26 at opposite ends of the body, said sections when assembled being arranged side by side and its body sections together forming a tubular body while the socket sections thereof together form spherical sockets at the front and rear ends of the arm which embrace, respectively, the ball of the supporting head and the ball of the attaching bars.

The sections of the arm are connected by means which are adjustable and permit of drawing these sections together so that these socket sections bear frictionally against opposite sides of the balls on the base and the head. This adjustable connection preferably consists of a clamping screw 27, preferably of the thumb screw type, which passes through an opening 28 in the central part of the body of one arm section and bears with its head against the outer side thereof while its threaded shank engages with the threaded opening 29 in the body of the other arm section, as shown in Figs. 1, 2 and 3.

By this means a friction joint or grip is produced between the arm and the base and head which permits of adjusting the mirror at various angles and then retaining the same frictionally in place.

This bracket as a whole is composed of comparatively few parts which are simple and inexpensive in construction, the same when assembled can be conveniently adjusted to suit different requirements, and the same present a neat appearance which renders the same particularly available in cases where this is an important consideration.

I claim as my invention:

1. A bracket for supporting mirrors and the like comprising a plate, lugs arranged on opposite edges of said plate and integral therewith and folded toward each other and constructed to form two semi-spherical sections of a ball, and an arm having two semi-spherical socket sections which are connected and which engage with opposite sides of said ball.

2. A bracket for supporting a mirror and the like comprising a base, an arm, and a head, said base and head each comprising a plate and lugs arranged on opposite edges of the plate and integral therewith and folded toward each other to form two semi-spherical sections of a ball, and said arm comprising two longitudinal sections arranged side by side and connected with each other and having their ends constructed to form semi-spherical sections of sockets which receive said balls of said base and head.

3. The combination with a mirror, of cooperating holding members engaging opposite edges of said mirror and having cooperating rounded portions forming a ball, and a supporting clamp adjustably engaging said cooperating rounded portions.

WILLIAM LaHODNY.